United States Patent [19]

Hirko et al.

[11] 4,171,342

[45] Oct. 16, 1979

[54] RECOVERY OF CALCIUM FLUORIDE FROM PHOSPHATE OPERATION WASTE WATER

[75] Inventors: Ronald J. Hirko; Harold E. Mills, both of Lake City, Fla.

[73] Assignee: Occidental Chemical Company, Houston, Tex.

[21] Appl. No.: 863,085

[22] Filed: Dec. 22, 1977

Related U.S. Application Data

[63] Continuation-in-part of Ser. No. 840,533, Oct. 11, 1977, abandoned, which is a continuation-in-part of Ser. No. 756,009, Jan. 3, 1977, abandoned, which is a continuation of Ser. No. 457,565, Apr. 3, 1974, abandoned.

[51] Int. Cl.$^2$ ............................................. C01F 11/22
[52] U.S. Cl. ...................................... 423/160; 210/45; 210/51; 210/53; 423/158; 423/163; 423/178; 423/490
[58] Field of Search ............... 423/158, 163, 490, 160, 423/178; 210/45, 51, 53

[56] References Cited

U.S. PATENT DOCUMENTS

| | | | |
|---|---|---|---|
| 2,780,523 | 2/1957 | Gloss | 423/490 |
| 2,889,200 | 6/1959 | LeBaron | 423/158 |
| 3,551,332 | 12/1970 | Baumann et al. | 210/53 |
| 3,625,648 | 12/1971 | Randolph | 423/163 |
| 3,699,212 | 10/1972 | Palm | 423/163 |

FOREIGN PATENT DOCUMENTS

2218288  9/1974  France.

*Primary Examiner*—Herbert T. Carter
*Attorney, Agent, or Firm*—Barry A. Bisson

[57] ABSTRACT

Calcium fluoride is produced from pond waters resulting from phosphoric acid processing by treating the pond waters with calcium carbonate and/or calcium oxide in two stages to precipitate out the major part of the fluorine values from the waters as calcium fluoride. After removal of the calcium fluoride the filtrate is treated with calcium oxide to remove a substantial portion of the remaining fluorine values as calcium fluoride. After removal of these calcium fluoride solids, the filtrate is treated with another charge of calcium oxide to produce dicalcium phosphate (dical) which is separated from the aqueous phase. The aqueous phase is treated with an additional charge of calcium oxide to remove a substantial portion of the solids from the aqueous phase leaving waters that can be discharged as waste or recycled as process water.

36 Claims, 1 Drawing Figure

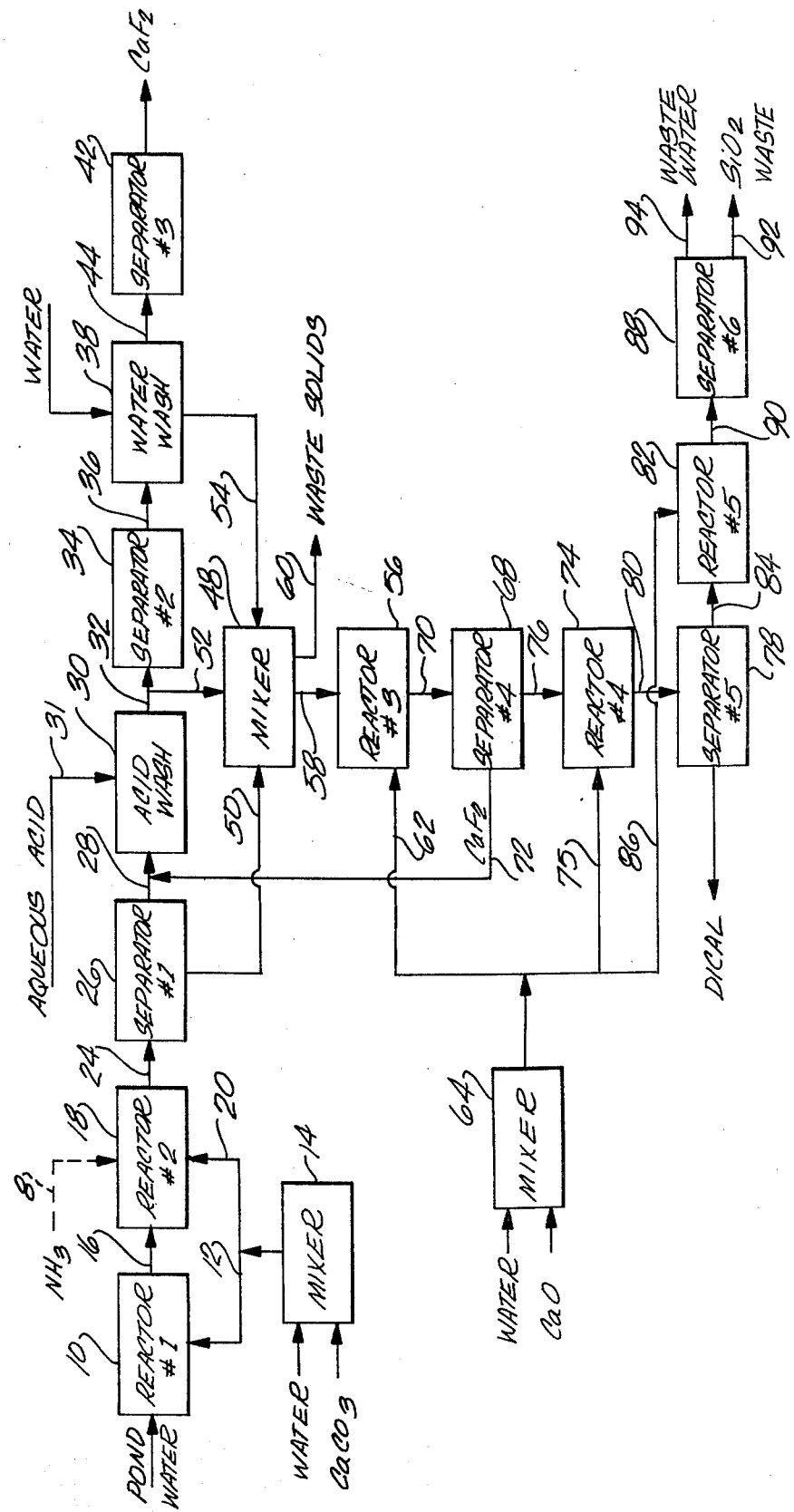

RECOVERY OF CALCIUM FLUORIDE FROM PHOSPHATE OPERATION WASTE WATER

CROSS-REFERENCE

This application is a continuation-in-part of co-assigned and co-pending U.S. patent application Ser. No. 840,533, filed on Oct. 11, 1977 and now abandoned; which is a continuation-in-part of U.S. patent application Ser. No. 756,009 filed on Jan. 3, 1977, and now abandoned; which is a continuation of U.S. patent application Ser. No. 457,565, filed on Apr. 3, 1974, and now abandoned. Each of these three patent applications is incorporated herein by reference.

BACKGROUND OF THE INVENTION

The present invention is directed to a method for recovering fluorine and phosphate values from waste waters or pond waters resulting from the production of wet process phosphoric acid. More particularly, the present invention is directed to a method of recovering calcium fluoride and calcium orthophosphate from phosphate waste waters. Moreover, the present invention provides a method of neutralizing the waste waters so they can be discharged into rivers and streams without fear of pollution or recycled as process waters in the production of phosphoric acid. For purposes of this invention, phosphate waste waters and pond waters shall be synonymous terms for waste.

In a wet process phosphoric acid plant using the dihydrate technique, about 50 gpm per ton of product $P_2O_5$ per day of waste water is directed to a waste pond. The pond water contains from about 0.1 to about 5% fluorine, from about 0.1 to about 5% $P_2O_5$, from about 0.1 to about 2.5% $SiO_2$, from about 0.1 to about 0.5% dissolved calcium and from about 0.1 to about 0.5% soluble sulfate salts. The fluorine in pond waters is a major concern because it can present an ecological hazard. The loss of $P_2O_5$ values in pond waters is considered a serious problem not only because it is a valuable product but also because it can present an ecological hazard.

Traditionally pond waters have been passed through settling basins prior to their discharge into rivers and streams. At times, pond waters are treated with limestone and lime to precipitate out fluorine and other values before discharge to meet pollution control laws and regulations. In the settling basins, the various chemical values, such as fluorine, $P_2O_5$, calcium, etc., decrease so that the pond water when discharged into the streams contains lesser, but appreciable, amounts of these materials. Not only do discharged pond waters add chemical values to streams, but they also cause a decrease in the pH of the streams. Pond water typically is acidic and has a pH from about 1 to about 3.

Workers in the art have recognized the economic loss and ecological problem of pond waters and have developed methods of treating pond waters. However, it appears that none of these methods have been economically attractive or feasible since none of the methods are in commercial use in the United States. For example, D. R. Randolph developed a method which is disclosed in U.S. Pat. No. 3,625,648. The Randolph method comprises treating pond water with milk of lime to adjust the pH of the resulting slurry to between about 3.2 and 3.5 whereby 99% of the available fluorine is precipitated out as calcium fluoride. The calcium fluoride is separated from the aqueous phase and treated with sulfuric acid, or other strong acid, to liberate the hydrogen fluoride gas and yield a slurry of gypsum, sulfuric acid and phosphoric acid. The latter slurry can be recycled back into a conventional wet acid phosphoric acid process to recover the $P_2O_5$ values. The HF gas can be upgraded pursuant to conventional methods. The aqueous phase, after removal of the calcium fluoride, is treated with an additional 10% milk of lime to adjust the pH to between 4.7 and 5 to precipitate out dicalcium phosphate. Dicalcium phosphate is separated from the aqueous phase and is upgraded in a conventional dicalcium phosphate plant or cycled to a conventional wet acid phosphoric acid plant to recover the phosphate values. The aqueous slurry is then treated with additional milk of lime to adjust the pH between 6 and 7 wherein further solids precipitate out. The solids are separated from the almost neutral aqueous phase and passed to waste. The aqueous phase is then recycled as process water to the phosphoric acid plant or dicharged into streams or rivers.

SUMMARY OF THE INVENTION

The present invention provides a method for treating phosphate waste waters so as to recover many of the valuable chemical values therein which are ecologically undesirable products in streams and lakes. The present invention also provides a method of rendering the pond waters neutral so that they can be discharged into streams or rivers or recycled as process water. The present method comprises treating the pond water with calcium carbonate, such as ground limestone or an aqueous slurry of ground limestone, in a first stage to form calcium salts containing phosphate and fluorine values. Between about 0.3 and 0.8 equivalent and preferably about 0.4 equivalent of calcium per equivalent of fluorine in the pond water is added in the first reaction stage. The reaction is normally carried out at the ambient temperature of the pond water; however, the reaction can be carried out at any temperature between the freezing temperature of the pond water and its boiling point. The residence time for this reaction stage is from about one-half minute to about 60 minutes, being preferably about 5 minutes. The pond water and the calcium carbonate are agitated to ensure maximum reaction between the calcium carbonate and the pond water values.

The treated pond water is then passed to a second stage wherein additional calcium carbonate is added so that no less than about 0.8 equivalent of calcium carbonate total per equivalent of fluorine is added in the two steps to the pond water. Preferably the calcium carbonate addition in the second stage is such as to provide a total calcium addition in the range of 1 to 2 equivalents per fluorine equivalent. The reaction in the second stage is also normally carried out at the ambient temperature of the pond water; however, the reaction can be carried out at any temperature between the freezing point of the treated pond water and its boiling point. The residence time in the second stage is from about one-half minute to about 60 minutes, being preferably about 30 minutes.

In the second stage a slurry is formed containing solid calcium fluoride and some solid calcium phosphate values. This slurry is passed to a separation stage wherein the solids are separated from the aqueous phase. The resulting solid cake is washed in an acid wash stage with an aqueous solution of a mineral acid, such as sulphuric acid, to remove phosphate and other acid soluble values from the solid calcium fluoride phase to raise the F/P$_2$O$_5$ weight ratio thereof. Preferably the solids are washed with an amount of mineral acid about equivalent to the total of the P$_2$O$_5$ values and CO$_2$ values contained in the solids. The solid phase is thereafter washed with water in a water wash stage to substantially remove most of aqueous soluble values and mineral acid, leaving a solid product containing up to about 45% by weight fluorine as calcium fluoride.

Calcium oxide can be used in place of all or part of the calcium carbonate added to the first stage and/or the second stage.

The aqueous mineral acid washings and the wash water from the solids are combined with the treated waste water effluent of the second stage in a mixer wherein they are mixed together to form as a first stream an aqueous mixture which is passed to a third stage wherein it is agitated with calcium oxide, such as ground lime or an aqueous lime slurry, in an amount sufficient to raise the pH of the first stream to between about 3 and about 4, preferably between 3.6 and 3.8, the pH of the first stream being initially between about 1.8 and about 2.6 because of the addition of wash acid. In the third stage, a substantial portion of the remaining portion of the remaining fluorine values in the aqueous mixture is converted to additional calcium fluoride which is subsequently separated from the treated aqueous mixture in a separator stage to yield a second crop of calcium fluoride solids which is recycled to the acid wash stage where it is subsequently washed with an aqueous mineral acid to remove the acid soluble values therefrom and then washed with water to remove acid and water soluble values therefrom to produce solids enriched in calcium fluoride. The second crop of solids can be combined with the solids separated from the second stage effluent prior to the acid washing of the separated solids.

The aqueous phase from the first separator stage is passed as a second stream to a fourth reactor stage wherein it is treated with additional calcium oxide in a slurry to raise the pH of the aqueous mixture to between 5 and about 8, preferably from about 6.5 to about 7.2. In the fourth stage, calcium orthophosphate ("dical" or dicalcium phosphate) solids are formed and precipitate out and are subsequently separated from the calcium oxide-treated aqueous mixture stream in a second separator stage to yield dical solid. The aqueous phase from the second separator is passed as a third stream to a fifth reactor stage wherein the third stream is further treated with slurried calcium oxide to raise the pH to a value between about 8 and about 11 to remove a substantial portion of the soluble mineral values from the aqueous phase by the formation of insoluble mineral solids. The calcium oxide is normally added to the third, fourth and fifth stages as a 5 to 50% by weight aqueous slurry, preferably about 10 to about 35% slurry. The calcium oxide slurry is prepared from fresh water, not pond waters or process waters containing F and P$_2$O$_5$ values. The mixture from the fifth stage is passed through a third separator stage wherein solids, mainly calcium values and silicon dioxide, are separated from the aqueous phase and passed to waste. The remaining aqueous phase is water which can be recycled back into a wet acid phosphoric acid.

DESCRIPTION OF THE DRAWING

The drawing is a schematic illustration of the process of the present invention.

DETAILED DESCRIPTION OF THE INVENTION

Referring to the drawing, pond water is passed to the first reactor stage 10. Simultaneously, calcium carbonate such as a stream of slurried calcium carbonate 12 is also passed to reactor 10. The stream 12 originates in a mixer 14 wherein a source of ground calcium carbonate, such as limestone, is mixed with fresh water, not pond water or process water containing F or P$_2$O$_5$ values, to form the calcium carbonate slurry. The calcium carbonate source is ground to at least a $-10$ mesh, preferably to a 90% $-200$ mesh. The calcium carbonate slurry is formulated with a solids content of between about 5 and about 50%, preferably about 10 to about 35%. The calcium carbonate slurry and pond water are agitated in reactor 10 for about 5 minutes, although shorter reaction times or long reaction times as described above can also be employed. The amount of calcium carbonate added to reactor 10 is designated as $Z_1$. $Z_1$ is equal to the equivalents of calcium added to the pond water per equivalents of fluorine in the pond water. $Z_1$ typically has a value of from about 0.3 to 0.8, preferably a value of about 0.4. The reaction that occurs in reactor 10 normally produces soluble calcium values such as Ca-SiF$_6$, although in some instances insoluble values will be formed. Preferably no solids will be formed in reactor 10.

The reaction mixture from reactor 10 passes as a stream 16 to a second reactor stage 18 wherein the stream 16 is mixed with additional calcium carbonate such as slurried calcium carbonate via stream 20. The stream 20 also originates from the mixer 14.

The reaction mixture in reactor 18 is agitated for a period of about 30 minutes, although shorter or longer residence times as described above can be employed. The amount of calcium carbonate added to reactor 18 is designated as $Z_2$. $Z_2$ is equal to at least $Z_R$ minus $Z_1$. $Z_R$ designates the minimum equivalence of calcium that should be added to reactors 10 and 18 to remove from about 85 to 100% of the fluorine values from the feed pond water. $Z_R$, on a mineral acid free basis, has a value equal to $1 + 0.1927 \, R_W$; wherein $R_W$ is equal to the weight ratio of P$_2$O$_5$ to fluorine in the pond water. $Z_R$ usually has a value of from about 1 to about 2. $Z_2$ has a value of from about 0.1 to about 2, preferably from about 0.4 to about 1.4; and an especially preferred range of from about 1 to about 1.4. In theory, the $Z_R$ value should provide sufficient calcium to remove the bulk of the fluorine from the pond water. However, as explained above, the pond water contains other values besides fluorine, such as P$_2$O$_5$ and sulfate, which can complex with the calcium and limit the amount of calcium available for reaction with the fluorine values. The $Z_R$ value takes account of those other values. However, preferably more calcium is added, such as 5% excess, than required according to the $Z_R$ value. However, excessive amounts of calcium are not necessary and interfere with the acid wash stage described below.

Dry or slurried calcium oxide can be used to replace all or part of the calcium carbonate added to the first reactor stage 10 and/or the second reactor stage 18. However, it is preferred that calcium carbonate be used because calcium carbonate is a less expensive source of water soluble calcium than is calcium oxide, and it is easier to control the pH in the reactor stages with calcium carbonate than with calcium oxide. This is because of the buffering effect of the carbonate ion.

The reaction mixture from reactor 18 is passed as a stream 24 to a first separator stage 26. The major part of the fluorine values in stream 24 are solid calcium fluoride, i.e., at least 50% of the fluoride values are solid calcium fluoride, and preferably at least 85%, and more preferably at least 95% of the fluorine values are solid calcium fluoride. In addition, substantially all the iron and aluminum values in stream 24 are solid values, and about 50% of the sulfate values and about 25% to about 50% of the $P_2O_5$ values are solid values.

The separator 26 can be a conventional liquid-solid separator, such as a filter, centrifuge or decanting tank. Preferably the separator 26 is a mechanical continuous thickener with a sludge-raking arm. A flocculent such as Dow AP 30 or AP 273, available from Dow Chemical Company, can be introduced to the thickener to aid in separation of the calcium fluoride containing solids from the liquid.

The calcium fluoride solids are separated from the liquid phase of stream 24 in separator 26 and passed as a stream 28 to an acid washer 30. The solids, which can contain about 15 to 35% fluorine, are washed with a stream 31 of a dilute aqueous solution of a strong mineral acid, such as sulfuric acid, hydrochloric acid, nitric acid or the like in the washer 30. In washer 30, the solid is washed with from about a 1 to about a 50% (w/w) mineral acid solution, preferably from about a 5 to about a 25% (w/w) acid solution. The calcium fluoride solids are preferably washed with an equivalent of mineral acid about equal to the equivalents of $P_2O_5$ and $CO_2$ values contained in the solids, plus or minus 10%. The acid concentration and wash temperature are controlled so that reaction between the fluorine values and the acid is minimized to prevent volitalization of hydrogen fluoride. The maximum wash temperature is about 180° F. Although any strong mineral acid, such as hydrochloric, perchloric, nitric, sulfuric, hydrofluoric or other strong mineral acids, can be used in the wash step, sulfuric acid is preferred. In the acid wash step, a substantial portion of the $P_2O_5$ values are removed from the solid product. In addition, other solid values, such as $CaCO_3$, $MgO$, $Fe_2O_3$, $Al_2O_3$ are also removed by the acid wash in varying amounts.

The wash slurry stream 32 is passed to separator 34 wherein the solids are separated from the aqueous phase. Separator 34 preferably is a thickener of the same type as separator 26. The solids from separator 34 are passed as stream 36 to a water washer 38 wherein the calcium fluoride stream 36 is washed with fresh water, not process waters or pond waters. The solid is washed with at least an equal weight amount of water, preferably about 2 weights of water, although larger amounts of water can be used in the wash. The water wash removes many of the soluble $P_2O_5$ values from the solids.

The acid wash and water wash up-grade the calcium fluoride solids with respect to the percentage of contained fluorine and the $F/P_2O_5$ weight ratio. The upgrade calcium fluoride solids can be converted to HF by conventional processes with conventional apparatuses.

The washed solid, as a slurry, is passed to a third separator stage 42 as stream 44. Separator 42 is a conventional liquid-solid separator such as separator 26 described above. Solids are separated from stream 44 in separator 42 to yield a cake containing up to about 45% fluorine as calcium fluoride. The cake can be processed by conventional means (not shown) into hydrogen fluoride or it can be dried by conventional means (not shown) at a temperature between about 90° and 150° C. and stored or transported as a dry solid. The calcium fluoride cake is substantially made up of calcium fluoride; however, the cake could also contain a small amount of $P_2O_5$ values, less than about 5%, silicon dioxide values less than about 3%, and sulfate values.

The calcium fluoride solids prepared by this process can be used as a precipitant to precipitate impurities from phosphoric acid as described in copending and coassigned U.S. patent application Ser. No. 810,484 filed on June 27, 1977. The Ser. No. 810,484 application is incorporated herein by this reference.

The calcium fluoride solids prepared by this process are of sufficient purity to prepare hydrogen fluoride directly therefrom by heating and treating the solids in the presence of sulfuric acid by conventional methods. If the $P_2O_5$ concentration is greater than about 5 to 10% or if the silicon dioxide concentration is greater than 5% in the calcium fluoride solids, it is difficult to prepare good quality hydrogen fluoride from the calcium fluoride solids by treatment with sulfuric acid. At high temperatures in an acid environment phosphorous and silicon will react with fluorine to produce gaseous fluorine values such as $PF_3O$, and $SiF_4$ which contaminate the hydrogen fluoride produced and are difficult to remove. Accordingly, it is one of the achievements of the present invention that a calcium fluoride solid can be produced which can be directly converted into hydrogen fluoride by conventional means.

The aqueous phases from the separators 26, 34 and 42 are passed to a mixer 48 as streams 50, 52 and 54 respectively. In the mixer 48, the various streams are thoroughly mixed together and passed to a third reactor stage 56 as stream 58. In the mixer 48 some solids, mainly gypsum, may settle out and are removed as stream 60 as waste solids.

In reactor 56, stream 58 is reacted with a slurry of calcium oxide from stream 62. The origin of stream 62 is a mixer 64 wherein a ground calcium oxide feed source, such as lime, and water are mixed to form a calcium oxide slurry. The calcium oxide food source is ground to at least $-10$ mesh, preferably at least 90% $-200$ mesh. The calcium oxide slurry prepared in mixer 64 contains from about 5 to about 50% solids, preferably from about 10 to about 35% solids. The calcium oxide slurry is prepared from fresh water and not pond waters or process waters.

The stream 58 has a pH between about 1.8 and about 2.6. Sufficient slurried calcium oxide is added to reactor 56 to raise the pH of the resulting reaction mixture from about 3 to about 4, preferably from about 3.6 to about 3.8. The retention time of stream 58 in reactor 56 is from about one half to about 60 minutes, preferably about 15 minutes. The reaction temperature within reactor 56 is from about the freezing point to the boiling point of the reaction mixture, preferably about ambient temperature. The reaction mixture contains about 0.01 to about 0.2% fluorine a substantial portion of which is precipitated out as calcium fluoride upon the addition of the calcium oxide.

The reaction mixture from the reactor 56 is passed to a fourth separator stage 68 as stream 70. The separator stage 68 is a conventional liquid-solid separator such as the separator 26 described above. The solids separated out in the separator 68 consist of calcium fluoride and phosphate values and are recycled as stream 72 to stream 28 wherein the solids undergo the acid wash and the water wash as described above as part of stream 28.

The aqueous phase separated in separator 68 is passed to a fourth reactor stage 74 as stream 76. In reactor 74, the aqueous phase is treated with slurried calcium oxide from stream 75 which has its origin from mixer 64. The reaction temperature and reaction residence time in the reactor 74 are similar to those in reactor 56. The pH of the stream 76 is from about 3 to about 4. Sufficient calcium oxide is added to reactor 74 to raise the pH of the reaction mixture to between about 5 and about 7 to cause the precipitation of dical (calcium orthophosphate or dicalcium phosphate). The reaction slurry from reactor 74 is passed to a fifth separator stage 78 as stream 80. The separator 78 is a conventional liquid-solid separator such as the separator 26 described above. The solids separated in separator 78 consist principally of dical. The dical produced by this method is of sufficient purity to employ in animal feed. That is, the P/F weight ratio in the dical is greater than 100.

The aqueous phase from the separator 78 is passed to a fifth reactor stage 82 as stream 84. Stream 84 is combined with a calcium oxide slurry from stream 86 in the reactor 82. Stream 86 has its origin from mixer 64. Sufficient calcium oxide is added to the reaction mixture in the reactor 82 to raise the pH to a value of between about 8 and about 11 to cause precipitation of a substantial portion of the remaining soluble minerals as insoluble values, such as silicon dioxide solids and other solids from the reaction mixture.

The reaction mixture in the reactor 82 is passed to a sixth separator stage 88 as stream 90. The separator 88 is a conventional liquid-solid separator such as the separator 26 as described above. Separated solids from the separator 88, comprised chiefly of silicon dioxide solids, are sent to waste as stream 92. The aqueous phase from separator 88 consists of a nonacidic water which is substantially free of calcium, fluoride, $P_2O_5$ and sulfate values. This water is discharged as stream 94 and can be used as a fresh water for industry or it can be discharged into streams or lakes.

In another embodiment of the present invention, ammonia is added to the reaction stream before stream 80, preferably in stream 8 or reactor 10. The ammonia is maintained at a concentration between about 10 and about 5000 parts per million, preferably a concentration of about 600 to around 800 parts per million ammonia. Presence of ammonia in the process stream optimizes the yield of calcium fluoride and the P/F ratio of the dical produced in reactor 74. The reason for this is not thoroughly understood. However, it is believed that the ammonia complexes with the fluorine values furnishing soluble fluorine values which can readily react with soluble calcium values to form the insoluble calcium fluoride. Thus the presence of ammonia not only enhances the quality of dical but also increases the removal of fluorine from the pond waters and the overall yield of calcium fluoride.

For purposes of this invention, references to percentages means weight percentages. The following examples and comparative examples are included to further illustrate the present invention.

EXAMPLE 1

To 3834 grams of pond water containing on a weight basis 0.94% F (predominantly $H_2SiF_6$), 1.70% $P_2O_5$, 0.41% $SO_3$, 0.59% $SiO_2$, and other soluble metallic compounds, at 110° F., were added 34.4 grams of ground commercial limestone (95% effective $CaCO_3$) as a 44.7% aqueous slurry ($Z_1 = 0.34$). The mixture was agitated for five minutes while the pH increased from 1.39 to 1.85. No fluoride values precipitated. Ground commercial limestone (106.9 grams) wetted with water was added to the reaction mixture and agitated ($Z_2 = 1.07$). $Z_R$ (theory) $= 1 + 0.1927 \times 1.70/0.94 = 1.35$; $Z_R$ (used) $= Z_1 + Z_2 = 0.34 + 1.07 = 1.41$ (4% excess $Ca^{++}$ over $Z_R$ (theory)). The pH of the reaction mixture after 37 minutes of agitation was 3.0. Calcium fluoride precipitated from the mixture was separated therefrom by decantation and filtration, and it was dried at 105° C. About 141 grams of calcium fluoride solids were recovered having the following analysis: 25.0% F. 15.3% $P_2O_5$, 3.6% $SO_3$, 49.8% CaO, <2.0% $SiO_2$, <2.0% $CO_2$ plus other metallics and 12.8% hydration water. The filtrate contained 0.017% F (about 2.2% of the fluorine in the pond water), 1.18% $P_2O_5$, and 0.62% $SiO_2$. The dried calcium fluoride solids were washed with 10% $H_2SO_4$ and water to reduce the $P_2O_5$ content of the solids to about 3.5%.

CONTROL 1

To 2000 grams of pond water at room temperature containing 0.84% F and 1.52% $P_2O_5$ were added 15.7 grams of ground commercial limestone slurried with water ($Z_1 = 0.34$) as a 33.3% aqueous slurry. The resulting mixture was agitated for about 5 minutes. Additional ground commercial limestone (17.9 grams) was added to the reaction mixture and the resulting mixture was agitated for an additional 200 minutes to ensure equilibrium conditions ($Z_2 = 0.38$; $Z_R$ (theory) $= 1.35$). The mixture was filtered. The filtrate contained 0.64% F and 1.30% $P_2O_5$ representing a 24% fluoride precipitation as calcium fluoride. This example demonstrates the low recovery of calcium fluoride which results when less than 0.8 equivalent of calcium per equivalent of fluorine is used ($Z_R$ (used) $= Z_1 + Z_2 = 0.34 + 0.38 = 0.72$).

CONTROL 2

In an experiment similar to that discussed in Example 1, the limestone was totally added at the start of the reaction rather than in two increments. The filtrate contained about 25% of the fluoride following filtration after 60 minutes of agitation.

EXAMPLE 2

Pond water similar to that used in Example 1 is heated to 200° F.; and to this solution, 1.4 equivalents of limestone as a 33% aqueous slurry per equivalent of contained fluoride are added in two stages ($Z_1 = 0.34$) with agitation to precipitate over 85% of the fluoride values as calcium fluoride. No adverse effects due to the temperature are observed.

EXAMPLE 3

Pond water, at room temperature, was diluted tenfold with water to contain 0.087% F and 0.153% $P_2O_5$. A quantity of pure limestone as a 35% aqueous slurry equivalent to a 129% stoichiometry based on initial total fluoride was added incrementally as in Example 1 ($Z_1 = 0.4$; $Z_2 = 0.89$; $Z_R = 1.34$). Ninety-five percent of the fluoride precipitated was calcium fluoride.

EXAMPLE 4

One thousand grams of pond water concentrated to contain 5.0% F and 8.5% $P_2O_5$ are chilled to 40° F. and are equilibrated with 52.7 grams of a commercial limestone as a 33% aqueous slurry ($Z_1 = 0.38$). After 5 minutes of agitation an additional 131.7 grams of limestone are added and agitation continues for five more minutes ($Z_2=0.95$; $Z_R=1.33$). An 80% fluoride recovery as calcium fluoride solids is realized.

EXAMPLE 5

A pond water containing 1% F as a 1:1 mole ratio of HF and $H_2SiF_6$ and 1% $P_2O_5$ is treated with a ground limestone slurry (10.5 parts $CaCO_3$ per 1000 parts pond water by weight). The resulting solution is agitated for 5 minutes ($Z_1=0.38$). About 20% of the fluoride precipitates at this time. Twenty-one grams of additional slurried limestone are added to the solution ($Z_2=0.76$; $Z_R=1.19$); and after 40 minutes of equilibration, the solids are flocculated, settled and separated. The calcium fluoride solids are dried at 105° C. and contain about 30% F and about 12% $P_2O_5$.

EXAMPLE 6

Pond water containing 0.45% F and 0.77% $P_2O_5$ was agitated and equilibrated with commercial limestone, as a 35% aqueous slurry which amounted to 40% of the stoichiometric quantity required for total fluoride precipitation at room temperature for 5 minutes ($Z_1=0.40$). An additional 70% limestone stoichiometry was added; and at 20 minutes of total reaction time ($Z_2=0.7$; $Z_R=1.33$), 0.12 equivalents of aqueous $NH_3$ were added per equivalent of initial fluoride and agitation continued for an additional 30 minutes. The resulting mixture was separated into a solid cake and filtrate. The soluble fluoride concentration in the filtrate was 0.056% F. This amounts to a 87% fluoride conversion to calcium fluoride; this is more than one would anticipate from the amount of calcium added ($Z_1+Z_2=82\%$ $Z_R$). The addition of ammonia apparently made some of the insitu calcium available for reaction with the fluorine.

EXAMPLE 7

One thousand grams of Example 1 pond water, at room temperature, was equilibrated with 1.25 equivalents of commercial limestone, as a 35% aqueous slurry, in two steps per equivalent of fluoride ($Z_1=0.4$; $Z_2=0.85$; $Z_R=1.36$). After 19 minutes of reaction, the aqueous phase contained 0.16% F. At this time, 0.069 equivalents of aqueous ammonia per equivalent of initial fluoride were introduced into the reaction mixture. The aqueous phase contained 0.14% F after ten minutes of reaction time. Subsequently, an additional 0.17 equivalents of ammonia per fluoride equivalent were added to the reaction mixture, and after 60 minutes of reaction time, the fluoride concentration in the filtrate was 0.0049% F. A 99.4% recovery of fluoride as calcium fluoride was realized. This shows that most of the fluorine in pond water containing a very low F concentration can be recovered as calcium fluoride without excessive $CaCO_3$ usage.

EXAMPLE 8

One hundred grams of dry, raw calcium fluoride solids such as produced in the preceding examples containing 25.3% F, 14.9% $P_2O_5$, 2.11% $Al_2O_3$, 52.6% CaO, 0.44% MgO, 1.30% $Fe_2O_3$ and 3.48% $CO_2$ was slurried with 100 grams of water in a Teflon beaker. To this slurry were added 125 grams of 38.3% $HNO_3$ which corresponded to 0.95 equivalents of $HNO_3$ per contained equivalent of $P_2O_5$ (equivalent weight taken as 23.66) plus 1.00 equivalent of $HNO_3$ per equivalent of contained $CO_2$. The resulting slurry was agitated at room temperature for about 15 minutes and filtered. The collected solids were further washed with three 500 gram portions of water. The leached calcium fluoride solids after drying at 105° C. contained 36.8% F and 6.04% $P_2O_5$. The acid washing and subsequent water washes removed 71.4 and 8.2% of the initially contained phosphorus and fluorine respectively. The quantity of phosphorus not leached from the raw calcium fluoride was in correlation with the quantities of metallics such as iron, aluminum and magnesium which were not removed.

The acid washing can also be conducted with other mineral acids such as hydrochloric acid and sulfuric acid, with similar results.

EXAMPLE 9

The same calcium fluoride solids that were treated in Example 3 were leached at room temperature with 9.8% aqueous $H_2SO_4$ using the same procedure as described in Example 10. However, 76.6 and 8.7 percent of the phosphorus and fluorine were leached from the raw calcium fluoride. The washed calcium fluoride solids when dried at 105°-110° C. contained 22.4% F, 3.3% $P_2O_5$ and 27.2% $SO_3$ resulting in the removal of 12% of the F and 78% of the $P_2O_5$.

CONTROL 3

The same dry, raw calcium fluoride solids as were used in Example 8 were slurried to 50% solids with water. The calcium fluoride solids were leached with 60.4% aqueous $H_2SO_4$ such that there existed 1.00 and 1.26 equivalents of sulfuric acid per contained equivalent of $CO_2$ and $P_2O_5$ respectively. The temperature ranged from 150° to 200° F. After filtration and subsequent water washing, the dry washed calcium fluoride contained 20.6% F and 2.11% $P_2O_5$. About 87.6 and 12.4 percent of the phosphorus and fluorine were contained in the combined leach and wash solutions respectively. At this temperature, approximately 6.2% of the initial fluorine was volatilized from the system. This example shows the problem of using a strong acid for leaching; namely, a high percentage of fluorine is volatilized from the system.

EXAMPLE 10

The same dry, raw calcium fluoride solids as were used in Example 8 are slurried to 50% (w/w) with water and are cooled to 4° C. This solution is leached with aqueous 4% $H_2SO_4$ at 4° C. such that there exists 2.26 equivalents of sulfuric acid per equivalent of $CO_2$ plus $P_2O_5$. The fluorine volatilization problem of Control 3 was not present. The solution is agitated for fifteen minutes, filtered, washed with water, and dried. Analysis of the solids indicates that 85% of the $P_2O_5$ is removed by the acid treatment. This example illustrates the effect of temperature and sulfuric acid concentration on the $P_2O_5$ leach stage.

EXAMPLE 11

A solution was prepared by combining separated limestone treated pond water, such as was produced in Example 1, and an acid leach and water wash mixture, such as were produced in Example 9. The solution contained 0.22% F, 1.09% $P_2O_5$, 0.4% $SiO_2$, and other soluble impurities. To 300 grams of this solution were added a total of 2.89 grams of pure calcium oxide slurried with water. The resulting mixture was agitated for 35 minutes. The pH increased from an initial 2.2 value to 9.7. The filtrate contained 6.4 ppm F, less than 3 ppm $P_2O_5$ and 252 ppm $SiO_2$ and was suitable for release into public waters.

EXAMPLE 12

To 300 grams of the same initial solution as was used in Example 11 were added 1.44 grams of pure calcium oxide slurried with water. The resulting mixture was agitated for about 20 minutes at room temperature to yield calcium fluoride solids which were removed by filtration. The filtrate had a pH of 3.4 and contained 220 ppm F and 9170 ppm $P_2O_5$. The weight ratio of P/F in the aqueous phase was increased from 2.16 to 18.2 after the addition of the lime.

EXAMPLE 13

To 300 grams of the same initial solutions as was used in Example 11 were added 0.72 gram of pure calcium oxide slurried with water and 1.28 grams of a 24.2% $NH_3$ solution at room temperature. The resulting solution was equilibrated for 20 minutes to a pH of 3.3 to yield calcium fluoride solids which were removed by filtration. The filtrate contained about 32.2 ppm F and 9200 ppm $P_2O_5$. In the presence of ammonia, less lime was required to obtain a weight ratio of P/F of about 122 than was required in Example 12 to obtain P/F weight ratio of 18.2.

EXAMPLE 14

Pond water was enriched with ammonia to contain about 0.08% $NH_3$ and treated with a slurry of commercial limestone in two steps as described in Example 1. After separation of the calcium fluoride solids, the defluorinated waste water was combined with acid leach and wash solutions to render a composite solution having a pH of 2.0 and containing 0.112% F, 1.10% $P_2O_5$, 0.28% $SiO_2$ plus other values. To 900 grams of this final composite solution at room temperature were added 2.94 grams of a commercial lime, assessed at 85% active CaO, and the resulting mixture was agitated for 35 minutes to a final pH of 3.5 to 3.6. The solid material formed was flocculated, settled and separated from the aqueous phase which contained 0.0027% F and 0.905% $P_2O_5$ and a weight ratio of P/F of 146. The solid material precipitated after drying at 105°–110° C. contained 19.5% F, 23.3% $P_2O_5$, 44.0% CaO, 1.47% $SiO_2$, 0.21% $NH_3$ plus other minor values. This solid material is suitable for acid leaching and washing to obtain a further quantity of calcium fluoride.

EXAMPLE 15

To 200 grams of a composite solution similar to that used in Example 14 but containing 4.69% $P_2O_5$ and 0.87% F were added 5.13 grams of pure lime slurried with water and 6.47 grams of a 29.0% $NH_3$ solution. This mixture was agitated for about 15 minutes to a pH of 4.0 while the temperature decreased from 180° F. to about 150° F. The filtrate contained 3.18% $P_2O_5$ and 0.0078% F yielding a P/F weight ratio of 178.

EXAMPLE 16

The procedure of Example 15 is conducted at 40° F. with no adverse effects on the resulting P/F ratio in the final filtrate.

EXAMPLE 17

Seven hundred forty-six and four-tenths grams of the final aqueous solution, having a P/F weight ratio of 146, produced in Example 14 were treated with 3.89 grams of a commercial lime slurried with water. The resulting mixture was agitated at room temperature for 15 minutes. The pH increased from 3.6 to 6.7. The solid precipitate was recovered by decantation and filtration, dried at 105° to 110° C., and found to contain 0.08% F, 39.2% $P_2O_5$, 31.9% CaO, 2.4% $SiO_2$, 21.8% weight loss at 800° C., plus other minor values. This solid having the stoichiometry of dicalcium phosphate, $CaHPO_4$, contained a P/F weight ratio of 214. This same solid contained 44.7% $P_2O_5$ when dried at 164° C.

EXAMPLE 18

This example demonstrates reactor 5 of the process. To a solution containing 29.5 ppm F and 1.23% $P_2O_5$ was added slurried commercial lime to a final pH of about 8.5. The mixture was agitated at room temperature for 90 minutes and the solids were recovered by filtration and were dried at 105° to 110° C. The solid material analyzed 0.14% F, 39.7% $P_2O_5$, 37.4% CaO, 6.3% $SiO_2$ (P/F=124).

EXAMPLE 19

This example demonstrates reactor 4 of the process. An initial solution similar to that used in Example 18 was treated with commercial lime to a pH of 6.2. The solids dried at 105° to 110° C. contained 0.12% F, 40.6% $P_2O_5$ and 30.7% CaO (P/F=148).

EXAMPLE 20

This example demonstrates reactor 4 of the process. A reaction similar to that of Example 19 is conducted at 180° F. No adverse effects on the final product are observed.

EXAMPLE 21

This example demonstrates reactor 4 of the process. A reaction similar to that in Example 19 but performed at 40° F. shows no adverse effects on the solid material.

EXAMPLE 22

This example demonstrates reactor 5 of the process. A solution containing 0.0010% F, 0.10% $P_2O_5$ and 0.3% $SiO_2$ at a pH of 7.0 is treated with slurried lime to a pH of 9.0 and is agitated for 30 minutes. The water decanted from the settled solution contains minute amounts of F, $P_2O_5$ and $SiO_2$.

EXAMPLE 23

A pond water containing 0.85% F, 1.49% $P_2O_5$, plus other impurities was heated to 203° F. and was then equilibrated with a total of 1.35 equivalents of commercial limestone per contained equivalent of fluoride in two stages as described in Example 1. In the first stage $Z_1$ calcium equivalents added equalled 0.4 and the $Z_2$ calcium equivalents equalled 0.95 in the second stage ($Z_R$=1.34). After 20 minutes of reaction time and subsequent separation of the solid material, the recovered solids at 105° C. drying, contained 25.6% F, 14.2% $P_2O_5$, 50.3% CaO, 1.8% $SiO_2$, plus other impurities and hydrated water. This material was of the same nature as found in Example 1 and shows that the precipitation of fluoride is not extremely dependent on temperature. The filtrate obtained was heated to 203° F. and was combined with slurried commercial lime to an equilibrated pH of 3.6 where calcium fluoride solids formed. The solids were separated from the liquid by decantation and filtration and analyzed 9.0% F, 31.7% $P_2O_5$, 48.6% CaO, 1.4% SiO$_2$, plus other impurities when dried at 105° C. The aqueous phase, which had a P$_2$O$_5$/F weight ratio of 333, from this reaction was heated to 194° F. and equilibrated to pH 7.2 with slurried commercial lime to form dical solids. After about 15 minutes of reaction, the dical solids were separated by decantation and filtration and were dried at 105° C. This material contained 0.21% F, 21.5% P$_2$O$_5$, 46.4% CaO, 9.1% SiO$_2$, plus other impurities and is suitable for granulation with phosphoric acid.

EXAMPLE 24

Pond water containing 1.01% F, and 1.84% P$_2$O$_5$ was first treated with 560 ppm of NH$_3$ and then reacted with commercial limestone as a 35% aqueous slurry, the solid material isolated and the filtrate combined with sulfuric acid wash solutions such as prepared in Control 3. In the first stage, Z$_1$ calcium equivalents equal to 0.38 were added and in the second stage, Z$_2$ calcium equivalents equal to 0.81 were added (Z$_R$=1.35). This final mixture containing 0.27% F and 1.70% P$_2$O$_5$ was raised to a pH of 3.5 to 3.6 with a 20% slurry of commercial lime and held at this pH for 20 minutes to render a P/F weight ratio of 153 in the aqueous phase after recovery of the solids. This liquid phase was further equilibrated with a 20% slurry of commercial lime to a pH of 10.0 for about 15 minutes. The recovered solids contained dicalcium phosphate and nearly all of the silica which would otherwise remain in solution at pH values of about 7.0 to 7.5 or less.

CONTROL 4

A pond water containing 0.3% F and 0.05% P$_2$O$_5$ is treated with one equivalent of calcium as an aqueous 33% limestone slurry per equivalent of contained fluoride with the mixture agitated for fifteen minutes (Z$_1$=1.00). An additional 0.01 equivalents of calcium per equivalent of contained fluoride are further added (Z$_2$=0.01; Z$_R$=1.01) and equilibrated by agitation for forty-five additional minutes. The calcium fluoride precipitate contains 40% F and 1% P$_2$O$_5$.

CONTROL 5

A pond water containing 0.3% F and 2.0% P$_2$O$_5$ is treated with limestone such that 1.1 equivalents of calcium as an aqueous 33% limestone slurry are added per equivalent of contained fluoride (Z$_1$=1.1). The mixture is equilibrated by agitation for five minutes after which time 1.19 equivalents of calcium per equivalent of contained fluoride are added (Z$_2$=1.19; Z$_R$=2.29), and the solution is equilibrated for an additional thirty minutes. The precipitated calcium fluoride contains 14% F and 28% P$_2$O$_5$.

EXAMPLE 25

One thousand grams of pond water containing 0.7% F and 1.3% P$_2$O$_5$ along with varied levels of other substances normally found in pond water was treated at 95° F. with 7.76 grams of 95% effective limestone slurried as a 40% mixture with water and agitated for five minutes (Z$_1$=0.4). To this mixture was added an additional 18.63 grams of limestone as in the previous manner and the agitation was continued for an additional thirty minutes (Z$_2$=0.96; Z$_R$=1.36). A raw calcium fluoride slurry containing 40% solids was collected by filtration of the reaction mixture and contained 23.80 grams of solids dried at 105° C. which were analyzed to contain 25.0% F, 15.0% P$_2$O$_5$ and 2.0% CO$_2$. The filtrate or treated pond water contained 1.59 grams of fluorine and analyzed 0.12% F and 1.11% P$_2$O$_5$. A sulfuric acid wash was applied to the raw calcium fluoride slurry whereby it was combined with 7.49 grams of sulfuric acid as ten percent aqueous solution and agitated for fifteen minutes at 95° F. Subsequent to filtration of the solids the filter cake was washed with two 119 gram portions of water. The 23.80 grams of dry calcium fluoride contained 22.7% F and 3.74% P$_2$O$_5$ with the diluent being primarily calcium sulfate. The combined acid and water wash filtrates were combined with the treated pond water to give 951.13 grams of a solution containing 0.17% F and 1.82% P$_2$O$_5$. This solution was made to contain 500 ppm NH$_3$ by the addition of a 25% NH$_3$ aqueous solution. Further treatment at 95° F. with 4.10 grams of 95% effective lime as a 20% water slurry to a pH of from 3.7 to 3.8 and with 15 minutes of agitation resulted in the precipitation of a second calcium fluoride solid having a dry-based analysis of 20.0% F and 20.0% P$_2$O$_5$ and amounted to 7.77 grams. This material in slurry form is taken back to the sulfuric acid leach stage and recycled through the system. The resulting filtrate contained 0.0031% F, 1.11% P$_2$O$_5$ and amounted to 954.12 grams. A further lime treatment comprised the addition of 7.48 grams of lime as in the previous manner in order that a pH of 6.9 to about 7 was maintained at 95° F. with fifteen minutes of agitation. The resulting 25.43 grams of dry calcium phosphate contained 0.12% F and 39.5% P$_2$O$_5$, a P/F weight ratio of 144, and was suitable for granulation to produce a feed grade material. The filtrate contained 0.0011% F, 0.056% P$_2$O$_5$ and all of the soluble silica initially present in the pond water. By this scheme of pond water treatment, 99.6% of the fluorine was converted into a synthetic calcium fluoride and 77.1% of the phosphate was transformed into a material which conforms to the P/F of 100 ratio necessary for a feed grade phosphate.

Calcium fluoride containing solids produced according to the method of this invention can be added to phosphoric acid to cause precipitation of a fluoride solid which contains ions of magnesium, and other metals which were in the impure acid, in accordance with the process described in U.S. patent application Ser. No. 810,484, filed on June 27, 1977, entitled "Metallic Ions Removal from Phosphoric Acid", and incorporated herein by this reference. The solids added to phosphoric acid for precipitation of metallic impurities can be solids 50 obtained from the first separator 26, solids 52 obtained from the second separator 34, solids obtained from the third separator 42, solids 72 obtained from the fourth separator 68, and combinations thereof.

It is claimed that:

1. The method of recovering calcium fluoride from pond waters comprising from about 0.1 to about 5.0% fluorine, from about 0.1 to about 5.0% P$_2$O$_5$, from about 0.1 to about 2.5% SiO$_2$, from about 0.1 to about 0.5 dissolved calcium, from about 0.1 to about 0.5% soluble sulfate salts, and soluble metallic compounds such as iron, aluminum, and magnesium comprising the steps of:

(a) adding with agitation to the pond water calcium carbonate in sufficient amounts so that between about 0.3 to about 0.8 equivalent of calcium is added per equivalent of fluorine whereby soluble calcium salts are formed;

(b) adding, with agitation to the calcium carbonate treated pond water of step (a), additional amounts of calcium carbonate corresponding to about 0.1 to about 2.0 equivalents of calcium per equivalent of fluorine so that the total calcium equivalent added in steps (a) and (b) is from about one to about two; whereby solids are formed comprising calcium fluoride, calcium phosphate, and silicon, iron, aluminum and magnesium;

(c) separating the solids from the pond water, said solids containing at least 85% of the initial fluorine present in the pond water as calcium fluoride; and (d) purifying the calcium fluoride in the solids recovered in step (c).

2. The method according to claim 1 in which the solids separated in step (c) contain substantially all of the iron and aluminum, substantial magnesium and silicon dioxide, about 50% of the sulfate, and from about 25 to about 50% of the $P_2O_5$ initially present in the pond water.

3. The method according to claim 1 in which the calcium carbonate is wetted with water to form a 5% to 50% slurry prior to the addition of the calcium carbonate to pond water in steps (a) and (b).

4. The method according to claim 1 wherein the pond water is treated with ammonia to maintain a concentration of between about 10 and about 5000 ppm of ammonia in the pond water during steps (a) and (b) in order to enhance the yield of calcium fluoride in the solids.

5. The method according to claim 1 wherein the pond water is treated with ammonia to maintain a concentration of between about 600 and 800 ppm of ammonia in the pond water during the steps (a) and (b) in order to enhance the yield of calcium fluoride in the solids.

6. The method of claim 1 in which solids separated in step (c) are separated from the pond water in a thickener with a raking arm.

7. A method of recovering calcium fluoride from pond waters comprising from about 0.1 to about 5.0% fluorine, from about 0.1 to about 5.0% $P_2O_5$, from about 0.1 to about 2.5% $SiO_2$, from about 0.1 to about 0.5 dissolved calcium, from about 0.1 to about 0.5% soluble sulfate salts, and soluble metallic compounds of iron, aluminum, and magnesium, said method comprising the steps of:

(a) adding with agitation to the pond water calcium carbonate in sufficient amounts so that between about 0.3 to about 0.8 equivalent of calcium is added per equivalent of fluorine whereby soluble calcium salts are formed;

(b) adding, with agitation to the calcium carbonate treated pond water of step (a), additional aounts of calcium carbonate corresponding to about 0.1 to about 2.0 equivalents of calcium per equivalent of fluorine so that the total calcium equivalent added in steps (a) and (b) is from about one to about two; whereby solids are formed comprising calcium fluoride, calcium phosphate, and silicon, iron, aluminum and magnesium values;

(c) separating the solids from the pond water, said solids containing at least 85% of the initial fluorine present in the pond water as calcium fluoride; and (d) purifying the calcium fluoride in the solids by treating the solids with an aqueous mineral acid to remove the acid soluble values therefrom and thereby yielding mineral acid washings, and thereafter washing the acid treated solids with water to remove the mineral acid and the water soluble values therefrom thereby yielding water washings and resulting in solids containing up to about 45% fluorine as calcium fluoride.

8. The method according to claim 7 wherein the treated pond waters after separation of the calcium fluoride solids therefrom are combined with such mineral acid washings and such water washings to form an aqueous mixture, the ammonia concentration of said aqueous mixture being maintained between about 10 and about 5000 ppm; separating the aqueous mixture from any solids formed therein; and treating with agitation the separated aqueous mixture with lime to raise the pH of the aqueous mixture to a value from about 3 to about 4 to form solids containing calcium fluoride; separating the treated aqueous mixture from the solids containing calcium fluoride; and recycling and combining the separated solids containing calcium fluoride with the initially formed solids containing calcium fluoride.

9. The method according to claim 8 wherein the treated aqueous mixture after separation of the calcium fluoride solids is treated with additional lime to raise the pH of the aqueous mixture to a value of between about 5 and about 8 to form insoluble dical solids.

10. The method of claim 9 wherein the insoluble dical solids are separated from the treated aqueous mixture; treating the aqueous mixture with additional lime to raise the pH to a value of between about 9 and about 11 to transform the soluble mineral values therein into insoluble mineral solids; and removing the insoluble mineral solids from the treated aqueous mixture.

11. A method of recovering calcium fluoride from pond water comprising from about 0.1 to about 5.0% fluorine values and from about 0.1 to about 5.0% $P_2O_5$ values comprising the steps of:

(a) adding with agitation to the pond water calcium carbonate in sufficient amounts such that between about 0.3 to about 0.8 equivalent of calcium is added per equivalent of the fluorine values whereby soluble calcium salts are formed;

(b) adding, with agitation to the calcium carbonate treated pond water from step (a), additional calcium carbonate corresponding to about 0.1 to about 2.0 equivalents of calcium per equivalent of the fluorine values present in the pond water to form solids containing calcium fluoride and calcium phosphate values, such that the total equivalent of calcium added in steps (a) and (b) is no less than about 0.8 equivalent per equivalent of fluorine values in the pond water, provided that when the total equivalent of calcium added in steps (a) and (b) is about 0.8, the amount added in step (a) is less than the total amount added in step (a) and step (b); and (c) separating solids from the pond water, said solids containing the major part of the initial fluorine values in the pond water as calcium fluoride.

12. The method of claim 11 in which the pond water comprises from about 0.1 to about 2.5% $SiO_2$, from about 0.1 to about 0.5% dissolved calcium, from about 0.1 to about 0.5% soluble sulfate salts, and soluble metallic compounds including iron, aluminum and magnesium, and wherein the formed solids contain calcium sulfate, silicon, iron, aluminum, and magnesium values.

13. The method according to claim 12 in which the solids separated in step (c) contain at least about 85% of the fluorine values, substantially all of the iron and aluminum values, substantial magnesium and silicon dioxide values, about 50% of the sulfate values, and from about 25 to about 50% of the $P_2O_5$ values initially present in the pond water.

14. The method according to claim 11 which includes the step of prewetting the calcium carbonate with water to form a 5% to 50% slurry prior to the addition of the calcium carbonae to the pond water in steps (a) and (b).

15. The method according to claim 11 including the additional step of treating the pond water with ammonia to establish an ammonia concentration of from about 10 to about 5000 ppm in said water in order to enhance the yield of calcium fluoride in the solids.

16. The method according to claim 11 including the additional step of treating the calcium carbonate treated pond water from step (a) with ammonia to establish an ammonia concentration of from about 10 to about 5000 ppm in the pond water in order to enhance the yield of calcium fluoride in the solids.

17. A method of recovering calcium fluoride from pond water comprising from about 0.1 to about 5.0% fluorine values and from about 0.1 to about 5.0% $P_2O_5$ values comprising the steps of:
 (a) adding with agitation to the pond water a calcium containing compound selected form the group consisting of calcium carbonate, calcium oxide, and combinations thereof in sufficient amounts such that between about 0.3 to about 0.8 equivalent of calcium is added per equivalent of the fluorine values whereby soluble calcium salts are formed;
 (b) adding, with agitation to the treated pond water from step (a), additional calcium containing compound selected from the group consisting of calcium carbonate, calcium oxide, and combinations thereof corresponding to about 0.1 to about 2.0 equivalents of calcium per equivalent of the fluorine values present in the pond water to form solids containing calcium fluoride and calcium phosphate values, such that the total equivalent of calcium added in steps (a) and (b) is no less than about 0.8 equivalent per equivalent of fluorine values in the pond water, provided that when the total equivalent of calcium added in steps (a) and (b) is about 0.8, the amount added in step (a) is less than the total amount added in step (a) and step (b);
 (c) separating solids from the pond water, said solids containing the major part of the initial fluorine values in the pond water as calcium fluoride; and
 (d) purifying calcium fluoride in the solids recovered in step (c).

18. The method of claim 17 in which solids separated in step (c) are separated from the pond water in a thickener with a raking arm.

19. The method of claim 17 in which the pond water comprises from about 0.1 to about 2.5% $SiO_2$, from about 0.1 to about 0.5% dissolved calcium, from about 0.1 to about 0.5% soluble sulfate salts, and soluble metallic compounds including iron, aluminum and magnesium, and wherein the formed solids contain calcium sulfate, silicon, iron, aluminum, and magnesium values.

20. The method according to claim 19 in which the solids separated in step (c) contain at least about 85% of the fluorine values, substantially all of the iron and aluminum values, substantial magnesium and silicon dioxide values, about 50% of the sulfate values, and from about 25 to about 50% of the $P_2O_5$ values initially present in the pond water.

21. The method according to claim 17 which includes the step of prewetting the calcium containing compound with water to form a 5% to 50% slurry prior to the addition of the calcium containing compound to the pond water in steps (a) and (b).

22. The method according to claim 17 including the additional step of treating the pond water with ammonia to establish an ammonia concentration of from about 10 to about 5000 ppm in said water in order to enhance the yield of calcium fluoride in the solids.

23. The method according to claim 17 including the additional step of treating the treated pond water from step (a) with ammonia to establish an ammonia concentration of from about 10 to about 5000 ppm in the pond water in order to enhance the yield of calcium fluoride in the solids.

24. The method of claim 17 in which the solids separated in step (c) contain at least 85% of the initial fluorine values in the pond water as calcium fluoride.

25. The method according to claim 17 in which the calcium containing compound added to pond water in steps (a) and (b) is calcium carbonate.

26. A method of recovering calcium fluoride from pond water comprising from about 0.1 to about 5.0% fluorine values and from about 0.1 to about 5.0% $P_2O_5$ values comprising the steps of:
 (a) adding with agitation to the pond water a calcium containing compound selected from the group consisting of calcium carbonate, calcium oxide, and combinations thereof in sufficient amounts such that between about 0.3 to about 0.8 equivalent of calcium is added per equivalent of the fluorine values whereby soluble calcium salts are formed;
 (b) adding, with agitation to the treated pond water from step (a), additional calcium containing compound selected from the group consisting of calcium carbonate, calcium oxide, and combinations thereof corresponding to about 0.1 to about 2.0 equivalents of calcium per equivalent of the fluorine values present in the pond water to form solids containing calcium fluoride and calcium phosphate values, such that the total equivalent of calcium added in steps (a) and (b) is no less than about 0.8 equivalent per equivalent of fluorine values in the pond water, provided that when the total equivalent of calcium added in steps (a) and (b) is about 0.8, the amount added in step (a) is less than the total amount added in step (a) and step (b);
 (c) separating solids from the pond water, said solids containing the major part of the initial fluorine values in the pond water as calcium fluoride, said solids containing from about 15 to about 35% fluorine; and
 (d) purifying calcium fluoride in the solids recovered in step (c) by treating said solids recovered in step (c) with an aqueous solution of a mineral acid to remove acid soluble values therefrom and thereby yielding aqueous mineral acid washings, and thereafter washing such acid treated solids with water to remove mineral acid and water soluble values therefrom thereby yielding water washings and resulting in solids containing up to about 45% fluorine as calcium fluoride.

27. The method according to claim 26 wherein the solids of step (d) containing calcium fluoride contain $CO_2$ values and are washed with an amount of mineral acid about equivalent to the equivalent of $P_2O_5$ values and $CO_2$ values contained in the solids.

28. The method according to claim 26 wherein the treated pond water after separation of the solids containing calcium fluoride is combined with such aqueous mineral acid washings and such water washings to form an aqueous mixture; and the aqueous mixture is treated by reacting it with agitation with calcium oxide in an amount sufficient to raise the pH of the aqueous mixture to a value of from about 3 to about 4 to convert a substantial portion of the remaining fluorine values in the aqueous mixture to insoluble calcium fluoride.

29. The method according to claim 28 wherein the aqueous mixture is treated with ammonia to establish a concentration of between about 10 to about 5000 ppm of ammonia in the aqueous mixture prior to reacting the aqueous mixture with calcium oxide in order to enhance the yield of calcium fluoride in the solids.

30. The method according to claim 28 in which the solids containing calcium fluoride are separated from the treated aqueous mixture to yield a second crop of solids containing calcium fluoride.

31. The method according to claim 30 wherein the second crop of solids containing calcium fluoride are combined with the separated solids containing calcium fluoride prior to the acid treating and water wash steps.

32. The method according to claim 26 in which the calcium containing compound added to pond wastes in steps (a) and (b) is calcium carbonate.

33. The method according to claim 30 wherein the treated aqueous mixture after separation of the calcium fluoride solids is treated with additional calcium oxide to raise the pH of the aqueous mixture to a value of from between about 5 and about 8 to form insoluble dicalcium phosphate solids.

34. The method according to claim 33 wherein the insoluble dicalcium phosphate solids are separated from the treated aqueous mixture.

35. The method according to claim 34 wherein the treated aqueous mixture after separation of the dicalcium phosphate solids is further treated with calcium oxide to raise the pH of the aqueous mixture to a value from about 8 to about 11 to remove a substantial portion of the soluble mineral values from the aqueous phase by the formation of insoluble mineral solids.

36. The method according to claim 35 wherein the insoluble mineral solids are separated from the treated aqueous mixture yielding an aqueous phase substantially free of fluorine, $P_2O_5$, calcium and silicon dioxide values.

* * * * *